(12) United States Patent
Seong et al.

(10) Patent No.: US 6,449,241 B1
(45) Date of Patent: Sep. 10, 2002

(54) OPTICAL DISK

(75) Inventors: Pyong-yong Seong, Seoul; Jung-wan Ko; In-sik Park, both of Suwon, all of (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/433,301

(22) Filed: Nov. 3, 1999

(51) Int. Cl.$^7$ ................................................. G11B 7/24
(52) U.S. Cl. ................................... 369/275.5; 428/64.9
(58) Field of Search ........................... 369/275.5, 283, 369/275.1, 286; 430/320, 321; 428/64.4, 64.1, 64.9

(56) References Cited

U.S. PATENT DOCUMENTS

| | | | |
|---|---|---|---|
| 5,838,646 A | * 11/1998 | Watanabe et al. | 369/13 |
| 5,838,656 A | * 11/1998 | Watanabe et al. | 369/275.2 |
| 6,023,451 A | * 2/2000 | Kashiwagi et al. | 369/275.5 |
| 6,128,274 A | * 10/2000 | Mori et al. | 369/275.5 |
| 6,345,034 B1 | * 2/2002 | Kim | 369/275.5 |

* cited by examiner

Primary Examiner—Tan Dinh

(74) Attorney, Agent, or Firm—Burns, Doane, Swecker & Mathis, LLP

(57) ABSTRACT

An optical disk having an improved structure is provided so that about 15 gigabytes or more can be recorded on each information recording surface. The optical disk includes at least one information substrate having an incident surface where light for recording/reproducing signals is input and a recording surface where information signals are recorded, and at least one reflection layer formed by being coated on the recording surface for reflecting at least a part of incident light. In the optical disk, assuming that the entire thickness of the optical disk is D and the distance between the incident surface and the recording surface of the information substrate is $D_1$, the inequality $0.20 \leq D_1/D \leq 0.38$ is satisfied. Also, the optical disk includes a first information substrate having an incident surface where light for recording/reproducing signals is input and a first recording surface where information signals are recorded, a first reflection layer formed by being coated on the first recording surface for reflecting at least a part of incident light, and a second reflection layer formed on the second recording surface for reflecting at least a part of incident light. In the optical disk, assuming that the entire thickness of the optical disk is D and the distance between the incident surface and the first recording surface of the first information substrate is $D_1$, the inequality $0.20 \leq D_1/D \leq 0.38$ is satisfied.

16 Claims, 4 Drawing Sheets

OPTICAL DISK

BACKGROUND OF THE INVENTION

1. Field of the Invention

The present invention relates to a high density optical disk, and more particularly, to an optical disk having an improved structure so that information of over about 15 gigabytes can be recorded on an information recording surface thereof.

2. Description of the Related Art

In general, an optical disk is widely adopted as an information recording medium of an optical pickup apparatus for recording/reproducing information in a non-contact manner. The optical disk is divided into compact disks (CDs) and digital versatile disks (DVDs). The specifications of the CD and DVD are determined considering the compatibility and information recording density, which are shown below in Table 1.

TABLE 1

|  | CD | DVD |
| --- | --- | --- |
| Diameter of optical disk (mm) | 120 | 120 |
| Thickness of optical disk (mm) | 1.2 | 1.2 |
| Thickness of information substrate (mm) | 1.2 | 0.6 |
| Track pitch ($\mu$m) | 1.6 | 0.74 |
| Minimum pit size ($\mu$m) | 0.83 | 0.4 |
| Wavelength (nm) | 780 | 635/650 |
| Single-sided capacity (GB) | 0.65 | 4.7 |

Here, the diameter and the thickness of an optical disk indicate the outer appearance of the CD and DVD and are set to be of identical sizes considering the inner space of a compatible optical disk player, and the size of an optical disk tray for loading/unloading the optical disk.

To achieve an information recording capacity of about 4.7 GB in a DVD, the DVD is standardized to have a different wavelength used, a different track pitch (the distance between a track and an adjacent track) and a different minimum pit size from those of the CD. That is, by using a smaller wavelength light emitted from a light source of an optical pickup apparatus, for example, a semiconductor laser, of 635/650 nm, the size of an optical spot formed on an optical disk can be decreased so that the track pitch and the minimum pit size can be reduced.

Also, as it was difficult to manufacture an optical disk having a thickness of 1.2 mm when the CD was first developed, the thickness of the optical disk is set to 1.2 mm so that deterioration in reproduced signals due to foreign material adhering to the surface of a substrate is minimized.

If the thickness of the DVD is standardized to be the same as that of the CD, as the allowable error in inclination of the optical disk according to high density decreases, there is a high probability that an error will occur during recording/reproducing of information. In consideration of the above, the thickness of the DVD substrate is set to 0.6 mm. Here, as the DVD records signals digitally, deterioration of signals due to contamination of a surface of the optical disk can be processed by means of a circuit.

The DVD having the above specification can be divided into a single-sided single layer structure, a double-sided single layer structure, a single-sided dual layer structure and a double-sided dual layer structure, as shown FIGS. 1 through 4.

Referring to FIG. 1, a single-sided single layer DVD includes an information substrate 1 of a thickness of 0.6 mm having a recording surface 1a at which information signals are recorded on the surface opposite the surface where light L is input, a reflection layer 3 formed by being coated on the recording surface 1a, a protective layer 5 for preventing oxidation of or damage to the reflection layer 3, a combining layer 7 and a protective substrate 9 attached to the protective layer 5 through the combining layer 7 for making the entire thickness of the optical disk correspond to the specification and preventing warping of the information substrate 1. The optical disk of a single-sided single layer structure has an information recording capacity of 4.7 gigabytes.

Referring to FIG. 2, a double-sided single layer DVD includes first and second information substrates 11 and 21 having thicknesses of 0.6 mm, first and second reflection layers 13 and 23 formed by being coated on recording surfaces 11a and 21a of the first and second information substrates 11 and 21, respectively, and a combining layer 15 provided between the first and second reflection layers 13 and 23. The optical disk of a double-sided single layer structure has an information recording capacity of about 9.4 gigabytes, twice the information recording capacity of the optical disk of a single-sided single layer structure.

Referring to FIG. 3, a single-sided dual layer DVD includes a first information substrate 31, a translucent layer 33 formed by being coated on a first recording surface 31a of the first information substrate 31, a second information substrate 35 formed on the translucent layer 33 to have a thickness of about 40 $\mu$m through a 2P (photo polymer) process and having a second recording layer 35a, a reflection layer 37 formed by being coated on the second recording surface 35a, a combining layer 38, and a protective substrate 39 having a thickness of about 0.6 mm combined by the combining layer 38 for protecting the first and second information substrates 31 and 35. In this case, the total information recording capacity recorded on the first and second recording surfaces 31a and 35a is about 8.5 gigabytes.

Referring to FIG. 4, a double-sided dual layer DVD includes two optical disks 41 and 45 where the protective substrate is excluded from the DVD of a single-sided dual layer structure of FIG. 3, and a combining layer 43 for combining these two optical disks 41 and 45. The double-sided dual layer DVD has an information recording capacity of 17 gigabytes, twice the capacity of the DVD of a single-sided dual layer structure.

The DVDs having one of the above structures maintains an overall thickness of 1.2 mm by combining 0.6 mm information substrate and/or protective substrate so that the information capacity is greater than that of a conventional CD.

When the thickness of the information substrate is standardized to 0.6 mm, by adopting a short wavelength optical pickup within a blue wavelength range (at 410 nm), high density information recording/reproducing at a level of 15 gigabyte per side is made possible. In this case, however, the allowable error in inclination of the optical disk which does not affect recording/reproducing sharply decreases. This is because the allowable amount of coma aberration according to the inclination of the optical disk is proportional to the wavelength, inversely proportional to the cube of the numerical aperture of an objective lens, and inversely proportional to the thickness of the optical disk.

Thus, even when the light source and the optical pickup apparatus having an objective lens satisfying the conditions needed for the ultra-high density information recording are adopted, when the DVD of the above structure is adopted as a recording medium, the allowable error in inclination of the optical disk decreases and thus the ultra-high density information recording/reproducing at a level of 15 gigabytes per side is not possible.

SUMMARY OF THE INVENTION

To solve the above problems, it is an objective of the present invention to provide an improved optical disk having the same size as that of a DVD or a CD with information capacity of 15 gigabytes or more per side.

Accordingly, to achieve the above objective, there is provided an optical disk comprising at least one information substrate having an incident surface where light for recording/reproducing signals is input and a recording surface where information signals are recorded, and at least one reflection layer formed by being coated on the recording surface for reflecting at least a part of incident light. In the above optical disk, assuming that the entire thickness of the optical disk is D and the distance between the incident surface and the recording surface of the information substrate is $D_1$, the inequality $0.20 \leq D_1/D \leq 0.38$ is satisfied.

Also, to achieve the above object, there is provided an optical disk comprising a first information substrate having an incident surface where light for recording/reproducing signals is input and a first recording surface where information signals are recorded, a first reflection layer formed by being coated or the first recording surface for reflecting at least a part of incident light, and a second reflection layer formed on the second recording surface for reflecting at least a part of incident light. In the above optical disk, assuming that the entire thickness of optical disk is D and the distance between the incident surface and the first recording surface of the first information substrate is $D_1$, the inequality $0.20 \leq D_1/D \leq 0.38$ is satisfied.

Also, to achieve the above object, there is provided an optical disk comprising a first information substrate having a first incident surface where light for recording/reproducing signals is input and a first recording surface where information signals are recorded, a first reflection layer formed by being coated on the first recording surface for reflecting a part of incident light, a second information substrate having a second incident surface where light for recording/ reproducing signals is input and a second recording surface where information signals are recorded, a second reflection layer formed on the second recording surface for reflecting a part of incident light, a third information substrate formed by being combined between the first information substrate and the second information substrate and having a third recording surface where information signals are recorded/ reproduced by light transmitted through the first information substrate and a fourth recording surface where information signals are recorded/reproduced by light transmitted through the second information substrate, a third reflection layer formed on the third recording surface for at least a part of incident light, and a fourth reflection layer formed on the fourth recording surface for at least a part of incident light. In the above optical disk, assuming that the entire thickness of the optical disk is D and each of the distances between the first incident surface and the first recording surface of the first information substrate and between the second incident surface and the second recording surface of the second information substrate is $D_1$, the inequality $0.20 \leq D_1/D \leq 0.38$ is satisfied.

BRIEF DESCRIPTION OF THE DRAWINGS

The above objective and advantages of the present invention will become more apparent by describing in detail a preferred embodiment thereof with referee to the attached drawings in which.

DETAILED DESCRIPTION OF THE INVENTION

Figure 1:
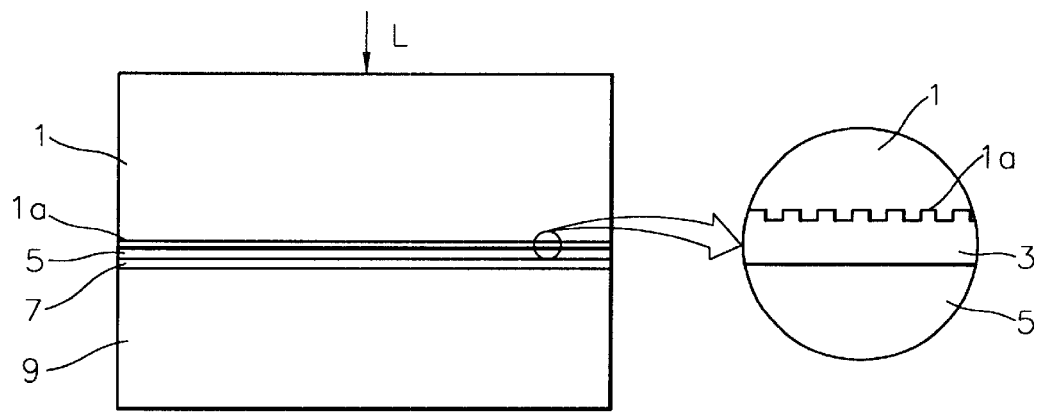
FIG. 1 is a sectional view showing a conventional optical disk of a single-sided single layer structure.
Figure 2:
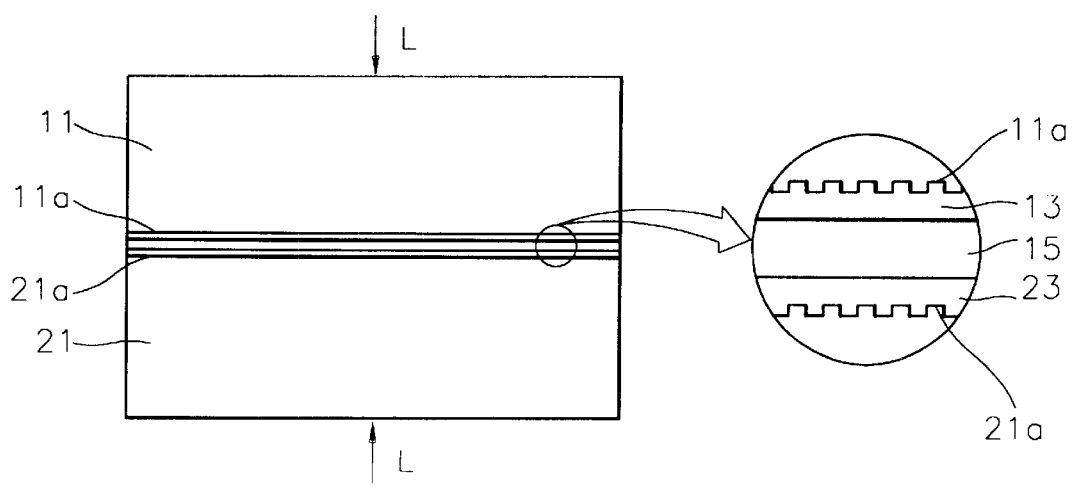
FIG. 2 is a sectional view showing a conventional optical disk of a double-sided single layer structure.
Figure 3:
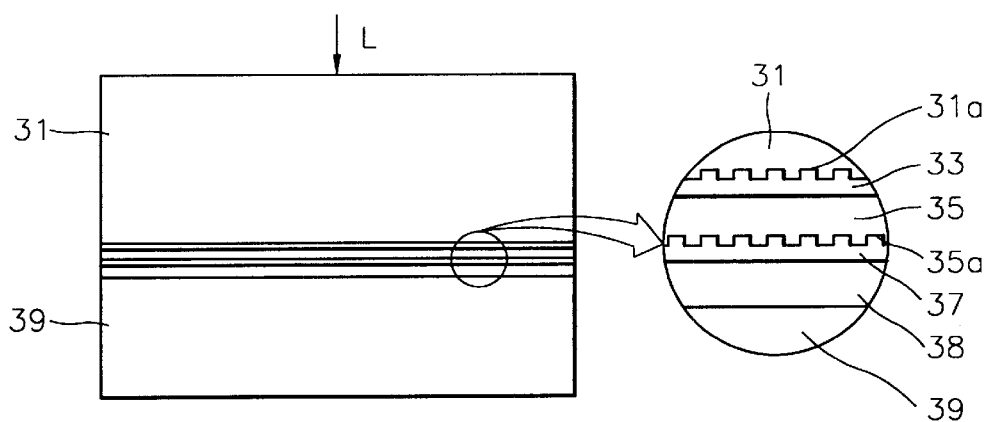
FIG. 3 is a sectional view showing a conventional optical disk of a single-sided dual layer structure.
Figure 4:
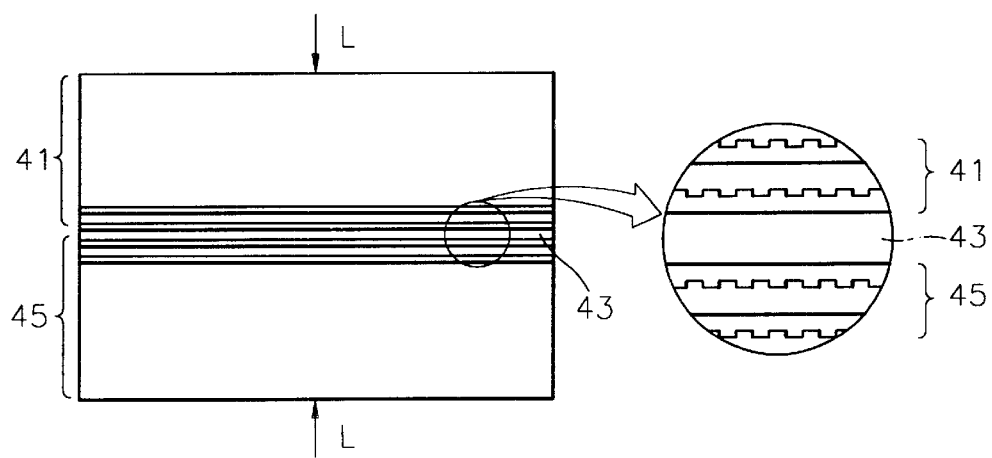
FIG. 4 is a sectional view showing a conventional optical disk of a double-sided dual layer structure.
Figure 5:
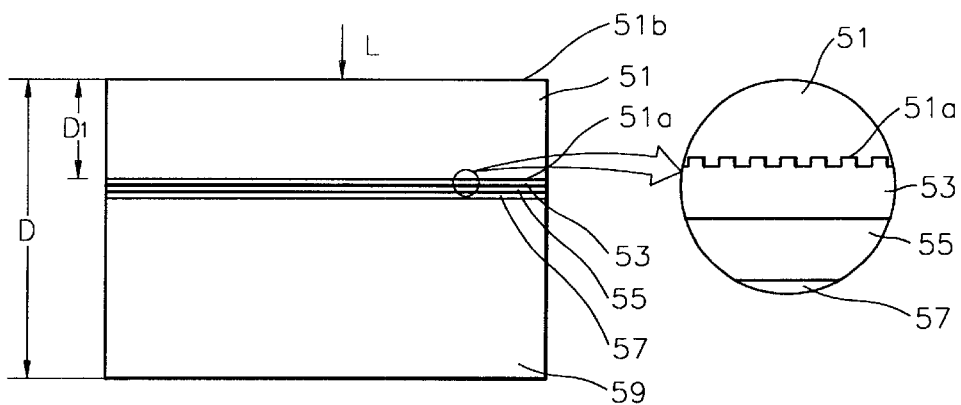
FIG. 5 is a sectional view showing an optical disk of a single-sided single layer structure according to a preferred embodiment of the present invention.

Referring to FIG. 5, an optical disk of a single-sided single layer structure according to a preferred embodiment of the present invention includes an incident surface 51b where light L is input, an information substrate 51 having a recording surface 51a where information signals are recorded, a reflection layer 53 formed by being coated on the recording surface 51a, a protective layer 55 formed on the reflection layer 53 for preventing oxidation of or damage to the reflection layer 53, a combining layer 57, and a protective substrate 59 combined to the protective layer 55 by the combining layer 57 for protecting the information layer 51. Here, the information substrate 51 and the protective substrate 59 have thicknesses in units of millimeters while the reflection layer 53, the protective layer 55 and the combining layer 57 have thicknesses in units of micrometers. Thus, the entire thickness of the optical disk of a single-sided single layer structure is determined by the thicknesses of the information substrate 51 and the protective substrate 59.

Here, assuming that the entire thickness of the optical disk is D and the distance between the incident surface 51b and the recording surface 51 information substrate 51 is $D_1$, Inequality 1 is satisfied as follows.

$$0.20 \leq D_1/D \leq 0.38 \qquad \text{[Inequality 1]}$$

Here, if $D_1/D$ is lower than the lower bound, defects occur at the incident surface of the optical disk due to scratches or contamination so that quality signals are not obtainable. Also, if $D_1/D$ is greater than the upper bound, as the allowable error in inclination of the optical disk due to coma aberration is within a range of the allowable error in manufacturing the optical disk, quality signals are not obtainable. Thus, if the value is out of these upper and lower bounds of Inequality 1, when the specifications of an optical disk and an optical pickup as indicated in Table 2 are satisfied to increase the information capacity of the optical disk, actual reproduction of signals is not made possible.

When the entire thickness D of the optical disk is 1.2 mm which is the thickness of a common optical disk, that is, a CD or a DVD, the thickness $D_1$ of the information substrate can be expressed by Inequality 2.

$0.24 \leq D_1 \leq 0.456$ (mm) [Inequality 2]

Here, the information capacity of the optical disk is determined by the specifications of an optical pickup apparatus such as the wavelength of a light source, the numerical aperture of an objective lens, and the specifications of the track pitch and the minimum pit size of the optical disk. That is, to achieve an information capacity of over 15 gigabytes per side of an optical disk, an optical disk and the wavelength of a light source suitable for the optical disk preferably satisfy the specifications shown in Table 2.

TABLE 2

|  | HD-DVD |
| --- | --- |
| Diameter of optical disk (mm) | about 120 |
| Thickness of optical disk (mm) | about 1.2 |
| Thickness of information substrate (mm) | about 0.4 |
| Track pitch (μm) | about 0.4 |
| Minimum pit size (μm) | about 0.23 |
| Wavelength (nm) | about 410 |
| Single-sided capacity (GB) | about 15 |

Figure 6:
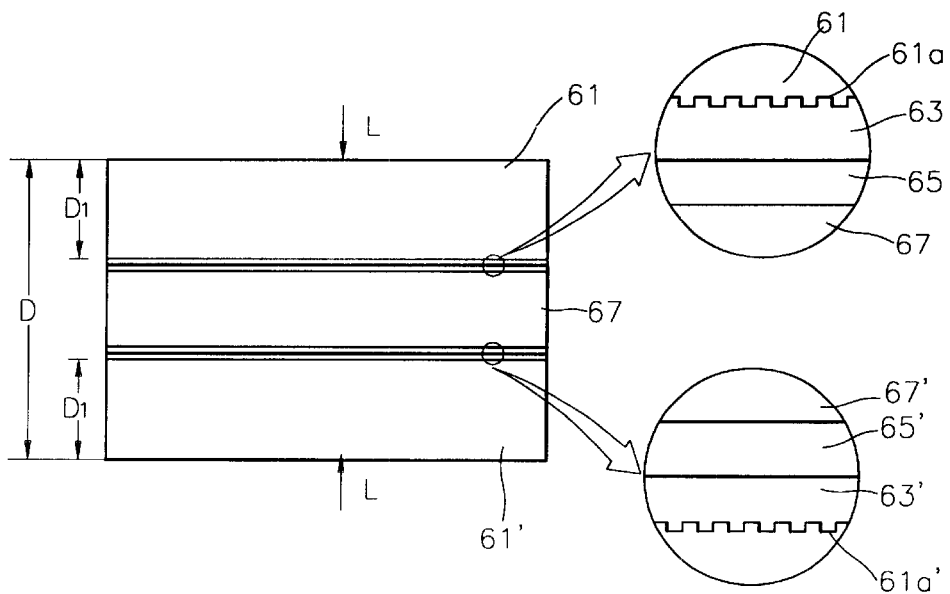
FIG. 6 is a sectional view showing an optical disk of a double-sided single layer structure according to a preferred embodiment of the present invention.

Referring to FIG. 6, an optical disk of a double-sided single layer structure according to a preferred embodiment of the present invention includes first and second information substrates 61 and 61', first and second reflection layers 63 and 63' formed by being coated on recording surfaces 61a and 61a' of the first and second information substrates 61 and 61', a spacer 67 provided between the first and second reflection layers 63 and 63', and first and second combining layers 65 and 65' combining the first and second reflection layers 63 and 63' and the spacer 67. Here, as the sum of the thicknesses of the first and second information substrates 61 and 61' is thinner than the entire thickness of the optical disk, the spacer 67 is provided to compensate therefor.

Here, assuming that the overall thickness of the optical disk is D and each of the thicknesses of the first and second information substrates 61 and 61' is $D_1$, it is preferable that the thickness of the information substrate to the overall thickness of the optical disk satisfies Inequality 1. Preferably, data of the optical disk including the track pitch and the minimum pit size of the first and second recording surfaces 61a and 61a' satisfy the specification of Table 2.

Figure 7:
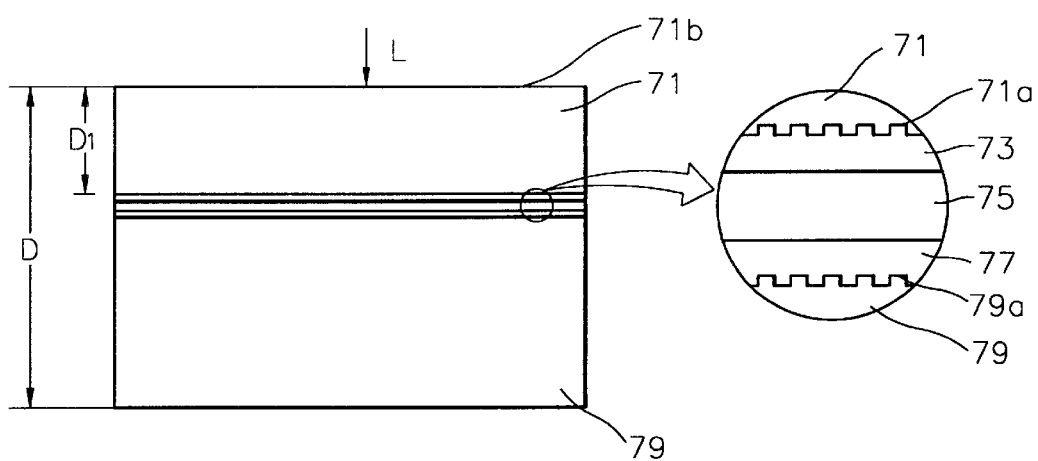
FIG. 7 is a sectional view showing an optical disk of a single-sided dual layer structure according to a preferred embodiment of the present invention.

Referring to FIG. 7, an optical disk of a single-sided dual layer structure according to a preferred embodiment of the present invention includes a first information substrate 71 having a first recording surface 71a, a first reflection layer 73, a second information substrate 79 having a second recording surface 79a, a combination layer 75 for combining the first and second information substrates 71 and 79, and a second reflection layer 77. Assuming that the overall thickness of the optical disk is D and that the distance between an incident surface 71b and the first recording surface 71a of the first information substrate 71 is $D_1$, Inequality 1 is satisfied.

The first information substrate 71 has the incident surface 71b where light for recording/reproducing signals is input and the first recording surface 71a where information signals are recorded. The first reflection layer 73 is formed on the first recording surface 71a and reflects a part of incident light. For example, the first reflection layer 73 is a translucent film to reflect a part of the incident light and transmit the remaining light toward the second recording surface 79a.

The second information substrate 79 has a second recording surface 79a where the information signals are recorded. The second reflection layer 77 is formed on the second recording surface 79a of the second information substrate 79 and reflects at least a part of the incident light. Here, the second reflection layer 77 which is a reflection film reflects most of the incident light. The second reflection layer 77 is combined to the first reflection layer 73 by the combining layer 75.

Here, a distance of about 40 μm is maintained between the first recording surface 71a and the second recording surface 79a. Preferably, data of the optical disk including the track pitch and the minimum pit size of the first and second recording surfaces 71a and 79a satisfy the conditions of Table 2. Also, the second information substrate 77 includes a plurality of recording surfaces and reflection layers in addition to the second recording surface 79a and the second reflection layer 77, thus forming an optical disk of a single-sided multiple layer structure.

Figure 8:
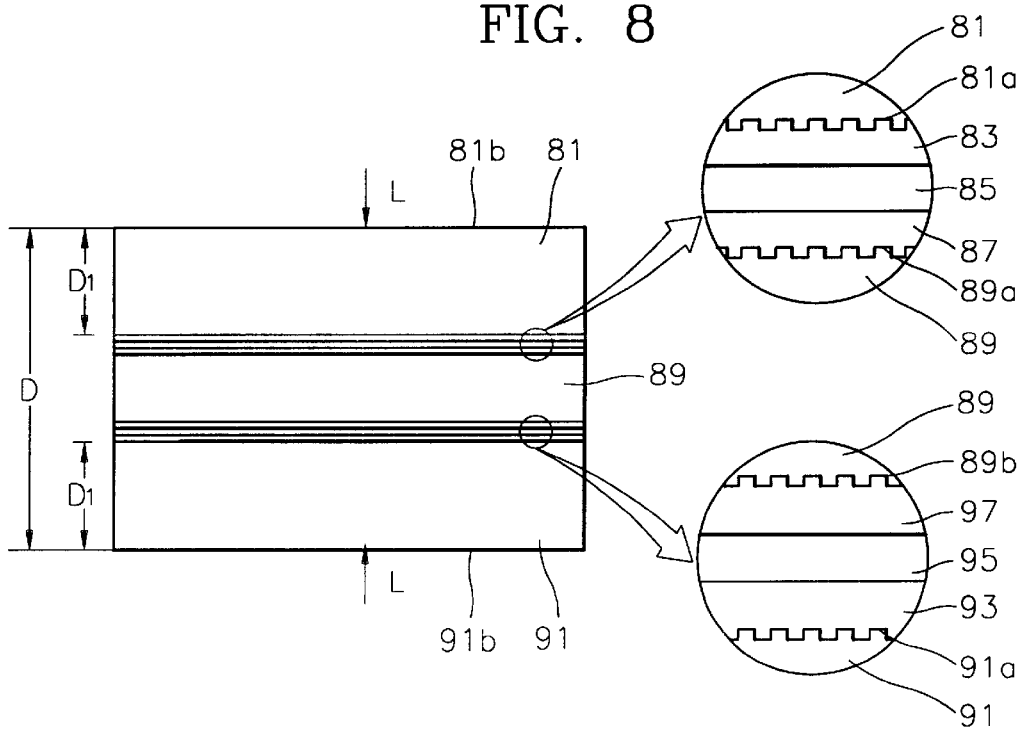
FIG. 8 is a sectional view showing an optical disk of a double-sided dual layer structure according to a preferred embodiment of the present invention.

Referring to FIG. 8, an optical disk of a double-sided dual layer structure according to a preferred embodiment of the present invention includes a first information substrate 81 having a first recording surface 81a, a first reflection layer 83, a second information substrate 91 having a second recording surface 91a, a second reflection layer 83, a third information substrate 89 disposed between the first information substrate 81 and the second information substrate 91 and having third and fourth recording surfaces 89a and 89b at each side, and the third and fourth reflection layers 87 and 97 formed on the third and fourth recording surfaces 89a and 89b of the third information substrate 89, respectively.

The first information substrate 81 has a first incident surface 81b where light L for recording/reproducing signals is input and the first recording surface 81a where information signals are recorded. The first reflection layer 83 formed on the first recording surface 81a reflects a part of the incident light and transmits the remaining light.

The second information substrate 91 has the same structure as that of the first information substrate 81, that is, a second incident surface 91b where light L for recording/reproducing signals is input and the second recording surface 91a where information signals are recorded. The second reflection layer 93 is formed on the second recording surface 91 a and reflects a part of the incident light.

The third information substrate 89 is combined to the first and second information substrates 81 and 91 by first and second combining layers 85 and 95, respectively, and has a third recording surface 89a where information signals are recorded/reproduced by the light transmitted through the first information substrate 81, and the fourth recording surface 89b where information signals are recorded/reproduced by the light transmitted through the second information substrate 91. The third reflection layer 87 formed on the third recording surface 89a and reflects at least a part of the incident light. The fourth reflection layer 97 formed on the fourth recording surface 89b and reflects at least a part of the incident light. Here, the distance between the first recording surface 81a and the third recording surface 89a and the distance between the second recording surface 91a and the fourth recording surface 89b are maintained to be about 40 μm.

Here, assuming that the overall thickness of the optical disk is D and each of the distances between the first incident surface 81b and the first recording surface 81a of the first information substrate 81 and between the second incident surface 91b and the second recording surface 91a of the second information substrate 91 is $D_1$, Inequality 1 is preferably satisfied.

Also, data of the optical disk including the track pitch and the minimum pit size of the first and second recording surfaces 81a and 91a preferably satisfy the conditions of Table 2. Also, the third and fourth recording surfaces 89a and 89b and the third and fourth reflection layers 87 and 97 of the third information substrate 89 may be configured with a plurality of layers.

Thus, in the optical disk according to the present invention, as the thickness of the information substrate to the overall thickness of the optical disk is reset, the above problem due to the inclination of the optical disk can be solved so that the optical disk has an information capacity of 15 gigabytes per side. Thus, in the case of an optical disk having a double-sided dual layer structure, the recording capacity can increase to up to 50 gigabytes.

Also, it is another advantage of the present invention that an optical disk of a single-sided single layer structure, a single-sided dual layer structure, a double-sided single layer structure, or a double-sided dual layer structure can be manufactured without a photo polymer process.

What is claimed is:

1. An optical disk comprising:
   at least one information substrate having an incident surface where light for recording/reproducing signals is input and a recording surface where information signals are recorded; and
   at least one reflection layer on the recording surface for reflecting at least a part of incident light,
   wherein, assuming that the entire thickness of the optical disk is D and the distance between the incident surface and the recording surface of the information substrate is $D_1$, the inequality $0.20 \leq D_1/D \leq 0.38$ is satisfied.

2. The optical disk as claimed in claim 1, further comprising:
   a protective layer formed on the reflection layer for preventing oxidation of or damage to the reflection layer; and
   a protective substrate combined to the protective layer by a combining layer for protecting the information substrate.

3. The optical disk as claimed in claim 1, comprising a pair of the information substrates and a spacer arranged between the information substrates, and a combining layer arranged between the spacer and each of the information substrates for combining the spacer and the information substrate, so that two incident surfaces of the information substrates are disposed to face each other.

4. The optical disk as claimed in claim 1, wherein the distance $D_1$ between the incident surface and the recording surface of the information substrate is about 0.4 mm.

5. The optical disk as claimed in claim 1, wherein the track pitch formed on the recording surface is about 0.4 $\mu$m and the minimum pit size recorded on a track of the recording surface is about 0.23 $\mu$m.

6. An optical disk comprising:
   a first information substrate having an incident surface where light for recording/reproducing signals is input and a first recording surface where information signals are recorded;
   a first reflection layer on the first recording surface for reflecting at least a part of incident light; and
   a second reflection layer on the second recording surface for reflecting at least a part of incident light,
   wherein, assuming that the entire thickness of the optical disk is D and the distance between the incident surface and the first recording surface of the first information substrate is $D_1$, the inequality $0.20 \leq D_1/D \leq 0.38$ is satisfied.

7. The optical disk as claimed in claim 6, wherein the distance $D_1$ between the incident surface and the first recording surface of the first information substrate is about 0.4 mm.

8. The optical disk as claimed in claim 6, wherein the track pitch formed on the first and/or second recording surface is about 0.4 $\mu$m and the minimum pit size recorded on a track of the first and/or second recording surfaces is about 0.23 $\mu$m.

9. An optical disk comprising:
   a first information substrate having a first incident surface where light for recording/reproducing signals is input and a first recording surface where information signals are recorded;
   a first reflection layer on the first recording surface for reflecting a part of incident light;
   a second information substrate having a second incident surface where light for recording/reproducing signals is input and a second recording surface where information signals are recorded;
   a second reflection layer on the second recording surface for reflecting a part of incident light;
   a third information substrate between the first information substrate and the second information substrate and having a third recording surface where information signals are recorded/reproduced by light transmitted through the first information substrate and a fourth recording surface where information signals are recorded/reproduced by light transmitted through the second information substrate;
   a third reflection layer on the third recording surface for at least a part of incident light; and
   a fourth reflection layer on the fourth recording surface for at least a part of incident light,
   wherein, assuming that the entire thickness of the optical disk is D and each of the distances between the first incident surface and the first recording surface of the first information substrate and between the second incident surface and the second recording surface of the second information substrate is $D_1$, the inequality $0.20 \leq D_1/D \leq 0.38$ is satisfied.

10. The optical disk as claimed in claim 9, wherein the distance $D_1$ is about 0.4 mm.

11. The optical disk as claimed in claim 9, wherein the track pitch formed on at least one of the first through fourth recording surfaces is about 0.4 $\mu$m and the minimum pit size recorded on at least one of the first through fourth recording surfaces is about 0.23 $\mu$m.

12. The optical disk as claimed in claim 6, wherein the distance between the incident surface and the recording surface of the information substrate is $D_1$ and satisfies the inequality $0.24 \leq D_1 \leq 0.456$ (mm).

13. The optical disk as claimed in claim 12, further comprising:
    a protective layer formed on the reflection layer for preventing oxidation of or damage to the reflection layer; and
    a protective substrate combined to the protective layer by a combining layer for protecting the information substrate.

14. The optical disk as claimed in claim 12, comprising a pair of the information substrates and the optical disk further comprises a spacer arranged between the information substrates, and a combining layer arranged between the spacer and each of the information substrates for combining the spacer and the information substrate, so that two incident surfaces of the information substrates are disposed to face each other.

15. The optical disk as claimed in claim 12, wherein the distance $D_1$ between the incident surface and the recording surface of the information substrate is about 0.4 mm.

16. The optical disk as claimed in claim 12, wherein the track pitch formed on the recording surface is about 0.4 $\mu$m and the minimum pit size recorded on a track of the recording surface is about 0.23 $\mu$m.

* * * * *